May 22, 1962  F. ABBÜHL  3,035,658
MUFFLER FOR INTERNAL COMBUSTION ENGINES
Filed Feb. 25, 1958  6 Sheets-Sheet 1

INVENTOR.
Fritz Abbühl
BY
Walter Becker
Patent Agent

May 22, 1962 F. ABBÜHL 3,035,658
MUFFLER FOR INTERNAL COMBUSTION ENGINES
Filed Feb. 25, 1958 6 Sheets-Sheet 3

INVENTOR.
Fritz Abbühl
BY

May 22, 1962 F. ABBÜHL 3,035,658
MUFFLER FOR INTERNAL COMBUSTION ENGINES
Filed Feb. 25, 1958 6 Sheets-Sheet 4

INVENTOR.
Fritz Abbühl
BY

May 22, 1962 F. ABBÜHL 3,035,658
MUFFLER FOR INTERNAL COMBUSTION ENGINES
Filed Feb. 25, 1958 6 Sheets-Sheet 5

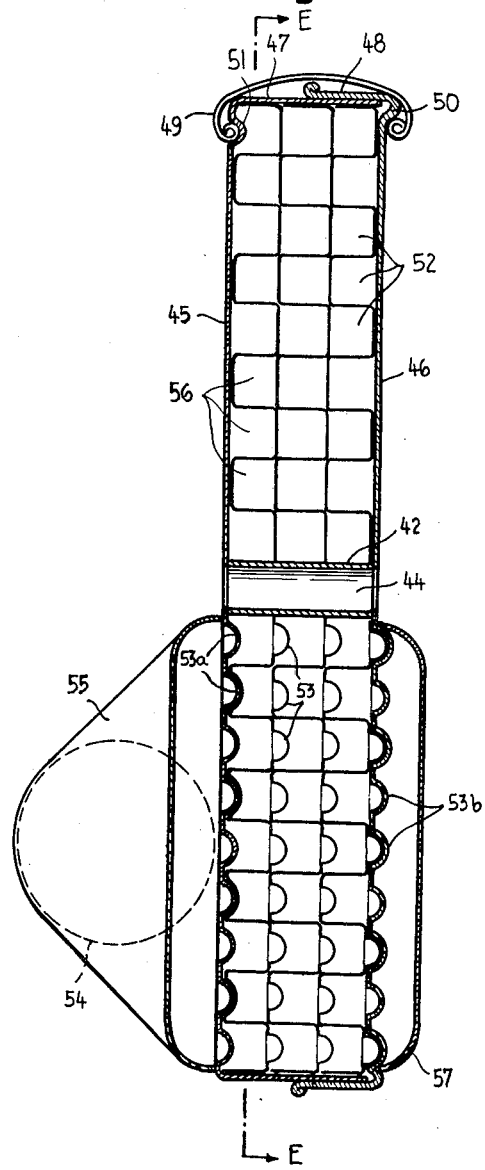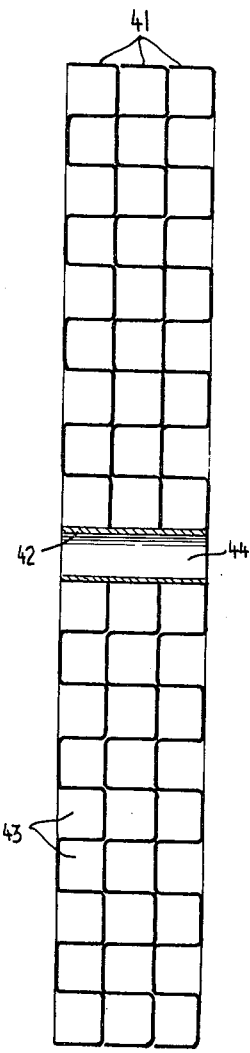

United States Patent Office 3,035,658
Patented May 22, 1962

1

3,035,658
MUFFLER FOR INTERNAL COMBUSTION
ENGINES
Fritz Abbühl, Zipfelweg 7, Adliswil, Switzerland
Filed Feb. 25, 1958, Ser. No. 719,988
Claims priority, application Switzerland Feb. 19, 1958
7 Claims. (Cl. 181—56)

The present invention relates to a muffler for internal combustion engines and is characterized by a closed housing which may be attached to the exhaust pipe of the engine and which is provided with inner gas guiding ducts returning at least part of the exhaust gas to the mouth of the exhaust gas pipe and supplying it into the entering gas stream while other portions of the gas stream are passed through ducts of different lengths and conducted away in steps.

Returning a portion of the gas stream to the mouth of the exhaust pipe enables the pressure differential between consecutive exhaust pulses to be equalized and bridged on the one hand, and the portion circulated to be used for aspirating the next gas pulse by application of the jet-jump principle on the other, which jointly causes noise to be suppressed and the revolutions of the engine to be slightly increased since the individual gas pulses emerging from the engine are relieved of some of their resistance.

A number of embodiments of the muffler according to this invention are represented in the accompanying drawing, in which:

FIGURE 6 is a cross-sectional view of the embodiment shown in FIGURE 5 and taken along line F—F thereof; and FIGURE 7 is a cross-sectional view of the muffler similar to FIGURE 6 depicting its internal construction at a certain stage during assembly thereof.

Figure 1:
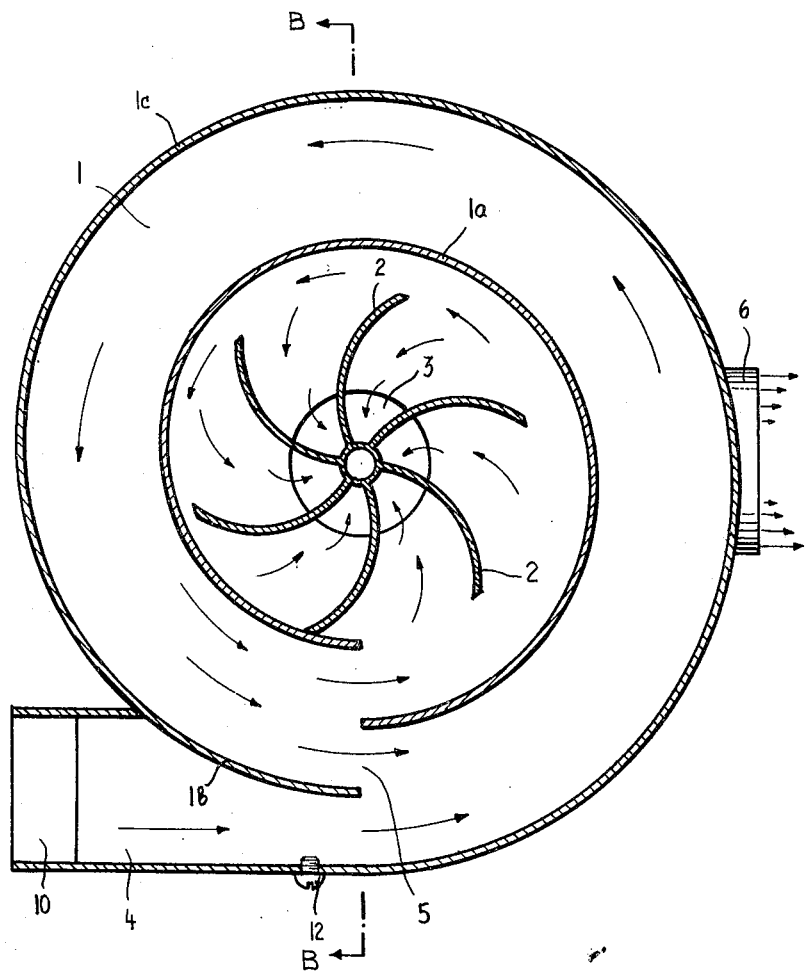
FIG. 1 is a longitudinal cross-sectional view taken along lines A—A of FIGURE 2 depicting a first embodiment of the present invention.
Figure 2:
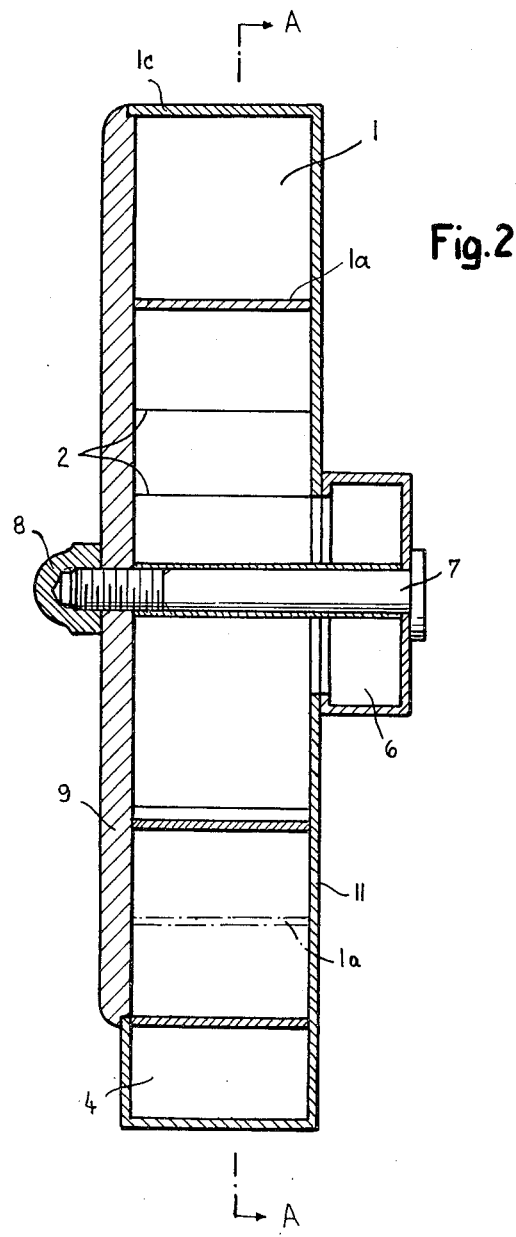
FIG. 2 is a cross-sectional view taken along lines B—B of FIG. 1.

In the embodiment according to FIGS. 1 and 2, an annular housing defined by the outer spirally extending wall 1c is provided with an outer gas conducting duct 1 which forms the direct continuation of the inlet connection 4 and of which one longitudinal half ends at the inlet opening 5. The longitudinal division of this duct at its end is obtained by one end of its inner partition wall 1a which deflects the other half of the gas stream in the inward direction where it reaches the area of a plurality of radially arranged baffles 2 which subdivide the gas stream into further fractional streams as indicated by the arrows in FIG. 1 and conduct them into the outlet opening 3 in several sectors and through the said opening into the escape connection 6. The inlet connection 4, which is arranged tangentially, is connected to the exhaust pipe 10 of an internal combustion engine and is constricted to the cross-sectional area shown in FIG. 1 by the wall 1b. The escape connection 6 is arranged laterally on the bottom plate of the housing and leads away from its centre in the radial direction. The annular flange 1c which forms the

2 outer boundary of the duct 1 forms the housing of the muffler together with the bottom plate 11 and the cover 9, which is thicker. A central screw 7 provided with a cap nut 8 holds the members of the muffler in their proper relative position. The reference numeral 12 designates a screw plug for the condensate drain.

The muffler disclosed may be manufactured by means of curved steel baffles and sheet iron, or it may be cast.

The muffler according to this invention operates as follows:

The exhaust gas entering the inlet connection 4 through the exhaust pipe in pulses is conducted in a circular path and returned to the point of entry. A portion of the exhaust gas can there again pass into the region of the inlet opening 5. This return is on the one hand assisted by the centrifugal force which tends away from the axis of rotation; on the other hand, a negative pressure is built up between two exhaust gas pulses which operates as a suction force on the returning gases according to the jet-pump principle.

The exhaust gas flowing into the pressure gaps equalizes the pressure flow in the curve so that the exhaust gas emerging from the circulation system has its vibration suppressed. The drainage retardation caused by the circulation of the gases is compensated by the sucking action of the pressure gaps between two exhaust gas pulses.

The balance of the gas stream follows the spiral wall 1a, the path narrowing gradually and the gases being gradually passed along the radial baffles to the outlet opening 3.

This manner of guiding and dividing the gases causes the gas volume to be passed into the exhaust pipe 6 in fractional portions at one time, the first fraction of the subsequent gas pulse following the last fractional volume of the previous gas pulse, thereby causing the exhaust from the muffler to be continuous.

The muffler according to this invention therefore employs the motive force of the exhaust gas stream to obtain both a centrifugal force and a suction force.

The operation of this muffler is accordingly a combination of the silencing principle of the so-called division of noise and pressure and the utilization, here applied for the first time, of the centrifugal and suction forces created by the gas pulse according to the jet-pump principle.

Figure 3:
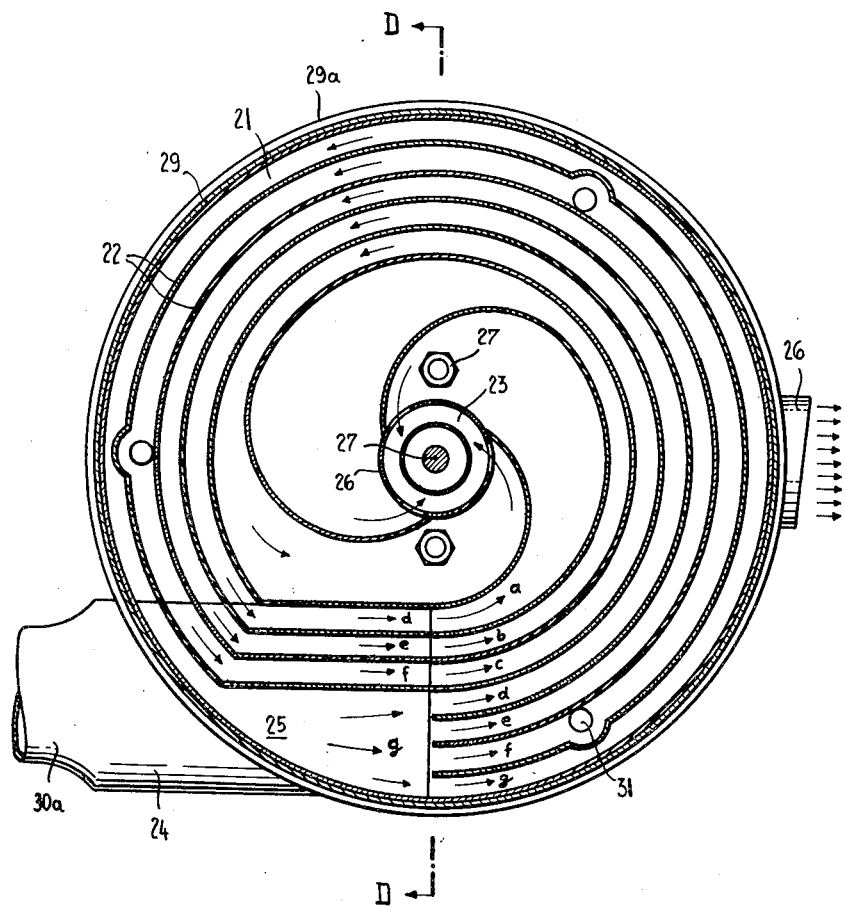
FIG. 3 is a longitudinal cross-sectional view of a second embodiment of the present invention and taken along lines C—C of FIGURE 4.
Figure 4:
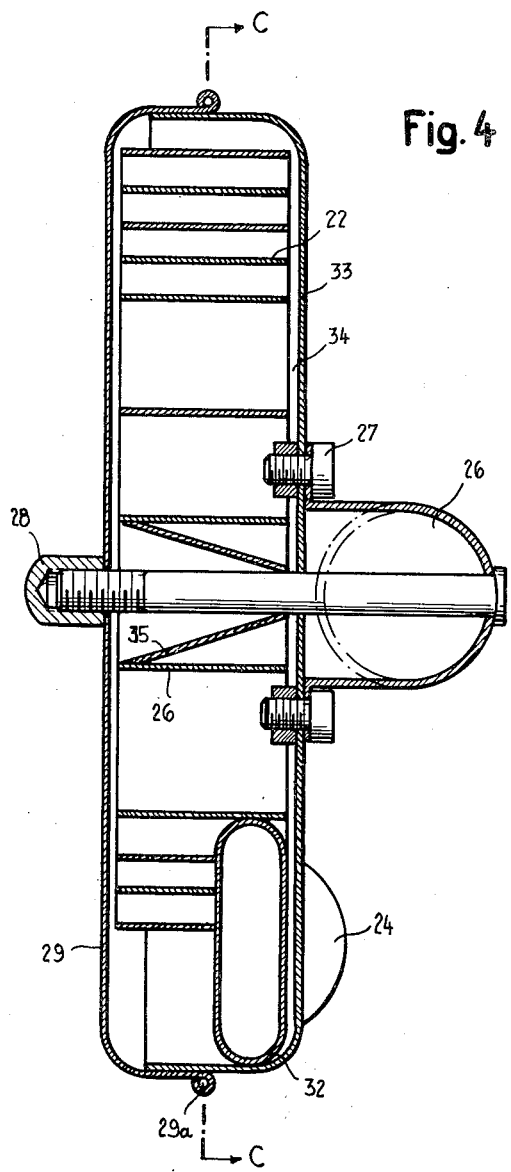
FIGURE 4 is a cross-sectional view of the muffler shown in FIGURE 3 and taken along lines D—D thereof.

The principle of the embodiment according to FIGS. 3 and 4 differs from that described above in that the inlet connection is flattened in the plane of the housing and opens into a plurality of parallel gas conducting conduits of which at least the two innermost spirally lead to a central outlet opening in the direction of flow.

The reference numeral 21 here designates the outermost gas conduit and 22 various baffles, while 23 designates a central outlet opening and 24 the inlet conduit which is designed to be connected to the exhaust pipe of the engine and flattened and compressed respectively in the plane of the muffler. The numeral 25 designates an outlet or collecting chamber for the returned portion of the gas, while 26 designates the outlet conduit; 27 designates mounting screws and 28 a cap nut. One housing lid is designated at 29 and the other at 33. The numeral 30a designates the transition from the round inlet cross-section to the flattened cross-section 32, 33 designates a housing lid in which are formed the bores for mounting screws, 34 an asbestos packing and 35 a conical guiding cup for the gas escape. 29a is the edge of one housing lid.

In mufflers connected to the exhaust pipe of an internal combustion engine, the individual gas pulses enter the housing through the flattened portion 32 of the inlet conduit 24 and are subdivided into seven gas streams by the baffles 22 defining openings for said inlet conduit. The innermost streams a–c are conducted directly to the cone 35 and into the exhaust conduit 26 by the three spirally bent innermost baffles so that they travel along paths of different lengths, and in the said exhaust conduit they are equalized by this sound subdivision.

The streams d–g perform one revolution in the housing and are returned to the openings from the flattened portion 32 of inlet conduit 24. At this point a portion of the exhaust gas can again return to the inlet conduit. This return flow is favoured by the radial centrifugal force on the one hand, which tends away from the axis of rotation, and on the other hand, a relative negative pressure is created between two exhaust gas pulses which exercises a sucking action on the returning gases.

The exhaust gas flowing into the pressure gaps equalizes the next pressure surge so that the exhaust gas emerging from the circulatory system is largely free from pressure surges.

The retardation of the drain caused by the curved or circular path of the gases is compensated by the sucking action of the pressure gaps between two gas pulses. The stream g can perform several revolutions before it is entirely or partly conducted into the streams a–c, which still further promotes subdivision.

The subdivision of the outer ducts improves the injecting action at the openings of portion 32 of the inlet conduit, so that the equalization of pressure surges is further enhanced.

Owing to the design disclosed, the muffler may be formed entirely of sheet metal, which simplifies manufacture.

Figure 5:
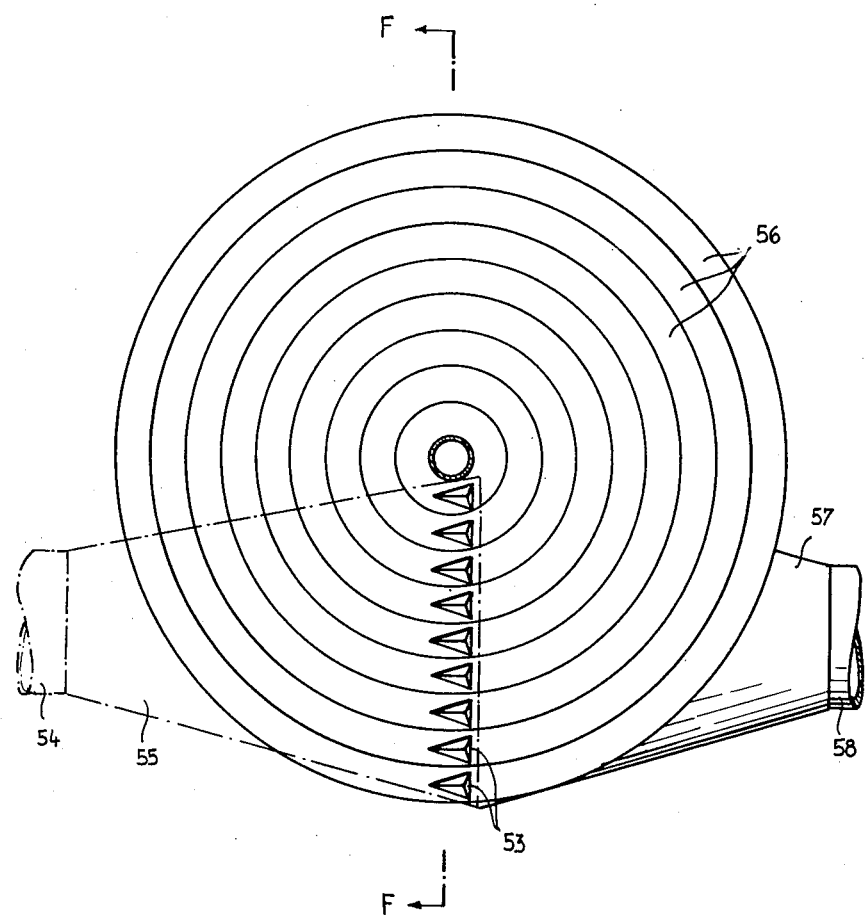
FIGURE 5 is a longitudinal cross-sectional view of a further embodiment of the present invention and taken along lines E—E of FIGURE 6.

The embodiment according to FIGS. 5 through 7 represents a design provided with several such parallel partitions, which form a muffler having several superimposed layers. In order to provide a particularly useful design in respect of manufacture, the serially arranged and endless conduits are formed by means of partitions in the form of three corrugated sheets 41, here having the shape of concentrical circular disks loosely slipped on a central tube end 42. The three disks or sheets 41 are of similar design and form conduits or channels 43 with vertical sidewalls. The conduits 43 are preferably provided with rounded or chamfered edges. A screw or the like may be inserted through the hole 44 in tube end 42 by means of which the three corrugated disks 41 and a cover disk 45 as well as a flat bottom disk 46 are assembled. The cover 45 and the bottom 46 are equipped with angular circumferential flanges 47 and 48 respectively which engage one another as shown in FIG. 6. Clamps 49 distributed over the circumference hold cover and bottom, which form the housing of the muffler, together at their peripheral portions. The bottom 46 is to this end provided with an annular bead or protrusion 50 which may have inserted therein an asbestos cord, while the cover disk 45 may be provided with indentations 51 which the clamps 49 engage. In this manner a more or less gas-tight housing is provided, and its tightness may be further improved by inserting a layer of a sealing material between the cover 45 and the bottom 46.

As shown in FIG. 6, the corrugated sheet disks 41, the cover 45 and bottom 46 form gas conduits 52 disposed in parallel and/or concentrical relationship. A lateral passage or port 53 from the inlet conduit or a conduit of an adjacent layer is formed by tangentially inclined rasp-type slots which, as shown in FIG. 5 are parallel to one another and tangential to the plane of the conduits. The rasp-type slots may be angular or circular, as shown in FIG. 6. The ports or slots 53 form guides for the passage of the gas streams from one layer of conduits 52 into the adjacent layer.

Each slot 53 (FIG. 6) at the same time forms both an outlet and an inlet opening for the individual gas streams.

As shown in FIG. 5, all passages are located in a common axial plane through the muffler housing.

The inlet conduit 54 is formed with a distributing funnel 55 arranged parallel with the housing plane. The said funnel is welded to the housing cover 45 and extends over approximately the entire radius (FIG. 5). The entering gas stream is thereby divided into a plurality of endless small individual streams which enter the first layer of conduits 56 through the entrance openings 53a and circulate in the former.

Having again reached the same radius, the gas streams enter the next-following layer of conduits through the transfer ports or slots 53, and so on until they flow into a collecting funnel 57 of an outlet conduit 58 through the exit slots 53b, which is parallel to the housing bottom, welded to the latter and extends substantially over the entire housing radius. The collecting funnel 57 finally opens into the escape connection 58 of the outlet conduit.

The muffler disclosed operates as follows:

The gas pulses successively emerging from the internal combustion engine are distributed over the entire radius of the housing by means of the inlet conduit funnel 55, and enter the first layer of endless conduits 56 through the slots or openings 53a. In said conduits they travel over different arc lengths and thus return to the point of entry at different times. There, staggered in time, they enter the next following layer of conduits. Repeated series of groups of conduits enable any desired improvement of the time stagger to be obtained so that the individual fractional gas streams emerge into the collecting funnel 57 with very large time intervals which causes the initial gas pulses finally to be transformed into a single continuous gas stream.

This enables not only a substantial silencing but a slight increase in the number of engine revolutions to be obtained under similar conditions since a relative negative pressure is created between each two exhaust gas pulses, which pressure exercises a sucking action on the returning gases and on subsequent gas pulses.

The last-named design of the muffler possesses the advantage of a very simple manufacture at extremely low costs.

The device disclosed for the equalization of pressure pulses can successfully be arranged at the suction side of an internal combustion engine, the air designed to be sucked into the cylinder or the cylinders of the engine being preagitated owing to the equalization of the pressure surge whereby the unproductive portion of engine performance is reduced.

Having now particularly described and ascertained the nature of my said invention and in what manner the same is to be performed, I declare that what I claim is:

1. A muffler for internal combustion engines comprising an inlet conduit having a plurality of exhaust openings in an end portion thereof, a plurality of concentric conduits, each having communication with one of said exhaust openings, and an outlet conduit having a plurality of ports opening into an end portion thereof, each port having communication with one of said concentric conduits.

2. The structure of claim 1 in which the circumferential distance from the exhaust opening of each concentric conduit about the conduit to its outlet port differs from the circumferential distance between said opening and port of each of the other conduits.

3. The structure of claim 1 in which said concentric conduits are arranged successively radially outwardly from the common center.

4. The structure of claim 1 in which said concentric conduits differ successively in length.

5. The structure of claim 1 in which said plurality of concentric conduits are connected to a second group of concentric conduits, each conduit of said second group communicating with an outlet opening of one of said first conduits, and with a port of said outlet conduit.

6. The structure of claim 1 in which each exhaust opening is formed to direct gases from said inlet conduit longitudinally of its concentric conduit, so the gas forms a jet pulse with each input from said inlet conduit, thereby reducing the pressure within said conduit adjacent said exhaust opening.

7. The structure of claim 6 in which said conduits extend circumferentially to connect with themselves adjacent said exhaust openings to provide continuous passages past said openings.

References Cited in the file of this patent

UNITED STATES PATENTS

| | | |
|---|---|---|
| 1,351,698 | Shuman et al. | Aug. 31, 1920 |
| 1,601,137 | Maxim | Sept. 28, 1926 |
| 1,658,126 | Jehle | Feb. 7, 1928 |
| 2,245,399 | Hill | June 10, 1941 |

FOREIGN PATENTS

| | | |
|---|---|---|
| 242,314 | Great Britain | June 9, 1927 |
| M 23,900 | Germany | Dec. 20, 1956 |